3,778,286
PROTECTION OF RUBBER SURFACES FROM OXIDATION EFFECTS
Stavros A. Kyriakides, 9215 Hillview Drive, Clarence, N.Y. 14031
No Drawing. Continuation-in-part of application Ser. No. 39,900, May 21, 1971. This application Jan. 3, 1972, Ser. No. 215,102
Int. Cl. C08c 17/24
U.S. Cl. 106—287 R         12 Claims

ABSTRACT OF THE DISCLOSURE

Synthetic and natural rubber vulcanizates are stabilized and protected against the effects of weather deterioration and ozone attack (surface cracking) by chemically treating the surface of rubber products with a composition comprising an alkyl substituted paraphenylene diamine, a wetting agent, such as an alkyl arylsulfonate, a terpene liquid, and a volatile solvent carrier. The composition is designed for migrating beneath the surface of the rubber vulcanizate, thereby assuring complete use and effectiveness of the antiozonant, and the protective coating is not impaired by flexing or scuffing.

---

This application is a continuation-in-part of my application Ser. No. 39,900 filed May 21, 1971 and the invention relates to the protection of surfaces of rubber products by chemical means. It relates particularly to a specially formulated coating which, when appiled to the surface of a rubber article, is absorbed by the rubber, and completely surrounds the oxidation-susceptible rubber with an envelope of an effective oxidation and ozone resistant agent. As is well-known, ozone is the most severe deteriorating force on rubber. Regardless of how well a rubber may age in the oxygen, its premature failure on outdoor exposure is generally caused from traces of ozone in the atmosphere. Ozone, a powerful oxidizing agent, reacts with the rubber and causes cracking in the places where it is under tension. Once the surface starts cracking, then degradation takes place at an accelerated rate. It detracts from the appearance, serviceability, and strength of the rubber product, and may lead to early failure. Any commercially available means which will provide preservative action of rubber surfaces from ozone attack or oxidation, has real economic value. There have been many attempts to overcome the problem of rubber degradation by the action of oxygen and ozone, or as commonly known "weathering." It is customary in this art to incorporate into the recipe of a rubber compound various chemical barriers to provide protection against ozone. Waxes, antioxidants and antiozonants consistute the protective agents. Their effectiveness, however, is reduced in the final vulcanizate as a result of their chemical reactions with other formula particulars such as reinforcing agents, accelerators and the like. The amount of antiozonant remaining in the rubber stock after vulcanization may vary from 60% to 100% of that originally added and as a result its resistance to oxidation is reduced.

An alternate method for effective and added protection was the external application of protective coatings to the finished vulcanizate. Numerous formulations of protective coatings of chemical, elastomeric, and plastic materials have been proposed and tested, but none so far gave adequate protection to non-ozone resistant rubber products in a high-ozone atmospheric area, and none of these products has been sufficiently economical to warrant general commercial use.

Several of these known protective coatings are solutions of antiozonants, and polymers or reims such as cellulose derivatives, shellac, and polymers acrylic momers etc. or are polymers of one or more of acrylonitrile, acrylic acid esters, vinylpyridines, and chloroprenes, as well as halogenated isobutylene-isoprene copolymers and ethylene-propylene-diene rubber. Some of these polymers have much better oxidation and ozone resistance than does natural rubber, SBR or the like. Films, therefore, made of these elastomers and applied on rubber articles could possibly improve temporarily the ozone resistance of the article, but the films are unsuitable because they have poor adhesion to the surface which should be protected, are tacky and are easly removed or scratched by sharp objects leaving the rubber uprotected.

It has also been proposed to apply to the surface of the rubber a solution of an antiozonant in volatile solvent of a type capable of dissolving unvulcanized rubber, the thought underlying such treatment is that the volatile solvent will migrate into the vulcanized rubber and carry with it therein the antiozonant. The usual volatile solvents proposed such as benezne ($C_6H_6$), toluene, and xylene, etc. while first perhaps carrying some antiozonant into the rubber act as an extractor of such materials as solvent volatilizes. It acts more as an extractor to carry antiozonant to the outside surface of the rubber article than as a carrier to deposit and retain the antiozonant in the interior of the surface region. Antiozonant desposited from such solvents are on the surface and may be rubbed off or removed by even slight abrasion that does not remove any of the rubber and thus leaves the underlying rubber exposed.

Protective coatings for rubber must meet definite stringent requirements before they can be considered satisfactory. They must be flexible and able to conform without cracking and without loss of adhesion to the flexible rubber surface when the latter is stretched or bent. They must always provide a continuous protective coating, and remain intact even when the surface is abraded by hard objects.

It is an object of this invention to provide a protective coating composition that will deposit and retain antiozonant within the rubber at the surface region where it cannot be rubbed off and will offer protection to the surface of the rubber article.

Another object is to provide a composition of matter as aforesaid, and a technique, which may be used in external application of antiozonant to the finished vulcanizate, thereby, assuring complete use and effectiveness of the antiozonant without any losses due to compounding variations, as when said antiozonants are incorporated into the rubber matrix.

A further object is to provide a chemical treatment to the surface of the rubber which is not impaired by even flexing or scuffing of the surface.

Another object of this invention is to provide a composition of matter so designed, to provide the desirable conditions for the antiozonant to migrate beneath the surface of the rubber, without the need of long drying periods.

The above objects are accomplished by applying to the surface of the rubber article a chemical composition comprising a mixture of one or more antiozonants, preferably selected from the group consisting of p-phenylenediamines, hereinafter known as PPDA, an organic penetrant comprised largely of one or more constituents of an organic terpene hydrocarbon of high solvent power, and optionally also especially for oil-resistant rubbers, a small proportion of one or more of an ester, such as amyl acetate, 2-ethyl hexyl acetate, butyl acetate and the like, and/or a glycol ether, such as methyl Cellosolve Cellosolve-acetate, and diethylene glycol methyl ether, and an alcohol of at least 6 carbon atoms such as isodecyl alcohol, octyl alcohol and ethyl butyl alcohol, a surface active agent and a volatile solvent selected from aliphatic, chlorinated aliphatic, and aromatic solvents necessary to produce a solution of sufficiently low viscosity which is readily absorbed by the rubber composition.

I have discovered that when this improved composition is applied to the rubber after its vulcanization, it protects it from cracking under both stationary or dynamic conditions and under high concentration of ozone. The coating remains intact even after abrasion of the surface, it is quickly migrated beneath the surface of the rubber, and provides a high concentration of oxidation barrier at the surface of the rubber where the ozone attack occurs. The coating also dries fast and provides satisfactory production merits which are obvious to persons familiar in the art.

More particularly, this invention is concerned with the use of di-alkyl substituted p-phenylenediamine (PPDA) derivatives soluble in most aliphatic, aromatic, and chlorinated solvents of which the following are exemplary:

N₁N'-dioctyl-PPDA
N₁N'-bis-(1 ethyl-3 methylpentyl)-PPDA
N₁N'-bis-(1 methylheptyl)-PPDA
N₁N'-di-sec-butyl-PPDA
N₁N'-phenyl-1,3 dimethyl-butyl-PPDA
N₁N'-dimethyl-N₁N'-di(methylpropyl)-PPDA
N₁N'-diphenyl-PPDA
N₁N'-di-β-naphthyl-PPDA
Unsymmetrically substituted phenylenediamine
N,N'-dioctyl-phenylenediamine
Modified N₁N'-di-β-naphthyl-PPDA
N-cyclohexyl-N'-phenyl-PPDA
N-isopropyl-N'-phenyl-PPDA
N-o-tolyl-N'-phenyl-PPDA The formula for N₁N'-dialkyl-p-phenylene diamine is

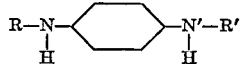

where R represents the alkyl constituents.

The most satisfactory products for use in the present invention are those which show compatibility to the elastomers for protection. The migration of the antiozonant beneath the surface of the rubber is increased by the incorporation of a wetting agent and a penetrant-solvent mixture. I found that the type of penetrant used in this case is very important in the promotion of the antiozonant migration. Degree of antiozonant solubility, solvent vapor pressure and composition, and surface wettability are the main factors contributing to satisfactory antiozonant migration or penetration, and full surface protection.

I have found that terpenes comprise unique liquids or liquid mixtures for natural rubber and non-oil resistant diene rubbers in that they act as penetrants which carry and retain antiozonants beneath the surface of the rubber article. They cannot be properly used to impart all of the required fluidity to the composition as in such amounts they tend to too greatly degrade the properties of the rubber. They may be considered to be a one way or retained penetrant. In the compositions, therefore one requires a volatile solvent as herein stated in addition to the terpene or terpene hydrocarbon.

In order to provide a more universal composition capable of use for treatment of so-called more oil resistant rubbers including acrylic rubbers, nitrile rubbers, poly chloroprenes, ethylene-propylene-diene rubbers and the like, the penetrant component preferably comprises a mixture of a major proportion liquid terpene hydrocarbons and a minor amount of one or more of liquid ketones, esters, and glycol ethers.

The protective coating in the present invention contains an amount of antiozonant or antiozonants, in a concentration preferably being more than 5 and less than 65 percent weight. About 0.2 to 8 percent by weight of wetting agents, preferably an alkyl aryl sulfonate should be present. The penetrant comprised of one or more terpenes and one or more of an ester, glycol ether, ketone, in an amount being more than 5 and less than 50 percent by weight of the composition and the penetrant composition should be not more than 75 percent of the penetrant-solvent mixture.

An excellent protective coating composition may be made by using about 5 to 65 percent by weight of a commercial N,N'-dioctyl-p-phenylene diamine antiozonant which antiozonant may for example be obtained from Universal Oil Products of Des Plaines, Ill., Eastman Chemical Company of Rochester, N.Y., and Monsanto Chemical Company of St. Louis, Mo. and 95 to 35% of the penetrant-solvent-wetting agent mixtures. Excellent results may be obtained using UOP–88 manufactured by Universal Oil Products as the antiozonant.

The protective coating may as aforesaid also contain a small amount of a suitable wetting agent such as Santomerse-D or Nacconol NR or Tergitol, said amount being at least 0.2% preferably being no more than about 8 percent by weight of the composition. Santomers D and Nacconol NR and trade names for aromatic products containing alkyl aryl groups supplied by Monsanto Chemical Company of St. Louis, Mo. and Harwick Standard Chemical Co. of Akron, Ohio, respectively. Tergitol is sodium alkyl sulfonate supplied by Chemicals and Plastics Division of Union Carbide of New York, N.Y.

The presence of a wetting agent reduces the tendency of the coating to break before it is absorbed by the rubber, thus assuring complete coverage of the surface, without exposing any untreated areas which will be unprotected from the ozone attack.

The effective constituents of this composition are special penetrants; such as an organic terpene and an ester, in an amount of no more than 65 percent by weight and the antiozonant, the solvent and wetting agent are merely present to facilitate application.

The organic terpene may be pine tar or any commercial terpene hydrocarbon, usually referred to as a cyclic compound such as Pinene or Dipentene. Such terpenes may be obtained from Buffalo Solvents and Chemicals Corporation, Buffalo, N.Y., or other Solvents and Chemicals Companies. The ester constituent, is an acetic acid reaction product such as amyl acetate, 2-ethylhexyl acetate, butyl acetate and the like. These products may be obtained also from Solvents and Chemicals Companies described above.

The presence of these penetrant components is to promote the migration and retention of the antiozonant beneath the surface of the rubber, counteract the extraction tendency when the carrier solvent is being completely evaporated from the surface. Retaining a low viscosity of the antiozonant constituent in solution during this period of migration, or absorption by the rubber, is also very important, because after rapid evaporation of the solvent the antiozonant returns to its original high viscosity, and stays on the surface of the rubber to be protected. At this state, only a temporary protection is achieved. To provide a continuous and long time protection of the rubber article, a concentrated amount of the antiozonant must remain beneath its surface. Then, as the antiozonant slowly "bleeds" to the surface of the rubber because of its solubility tendencies in the rubber, a continuous protection of the surface is afforded. Any damage of the protective surface, such as abrasion or scratching will always expose another surface which will be protected with the antiozonant.

The solvent carrier in this composition may be any commercial aliphatic, chlorinated, or aromatic solvent in an amount suitable to produce a consistency of the composition desired for convenient and practical application. Said solvents may be a combination of one or more solvents in suitable proportions. For example; the carrier solvent may be a mixture of a major proportion (usually at least 50% of an aliphatic petroleum naphtha, and a minor proportion (generally not over 40%) of a chlorinated solvent such as trichloroethane or trichloroethylene. The solvents should boil above 30° C. and below 135° C.

The chemical coating solution may be made up in any convenient concentration as required by the method of application. I have found that concentrations of about 3 to 50 percent by weight of PPDA are suitable to handle.

In general, the coating is applied after the rubber article is vulcanized. For best protection, the rubber article should be treated prior to any installation for service. Articles intended for long time storage under flex conditions, such as tires, wire cables, hose, conveyor belts, weather stripping and door seals require this chemical treatment before initiation of cracking occurs. Many rubber products installed on various equipment for sale, such as tractors, trailers, road equipment, and others, deteriorate before this equipment is sold. The same rubber deterioration occurs during their service life which results in down time for repairs, or replacement of the deteriorated rubber articles.

I have found that application of this chemical coating to tires and other rubber products described above, will provide adequate protection under both service and storage conditions, and will extend the service life and their appearance.

The following examples illustrate the practice of the invention:

EXAMPLE 1

Table I lists a number of rubber compositions representing in general, passenger car and truck tire sidewall formulations. Samples 1 and 3 have no antiozonant in the stock, samples 2 and 4 have 3 phr. (parts per hundred of rubber) of antiozonant mixed in the stock. All rubber compounds were mixed on a mill and the specimens were vulcanized to their optimum cure. Samples 2 and 4 were treated with the protective coating by brushing on two coats of the following solution:

SOLUTION I

| | Parts |
|---|---|
| UOP – 788 [1] | 20 |
| UOP – 288 [1] | 25 |
| Pinene | 25 |
| Isopropyl acetate | 5 |
| Hexane | 24 |
| Toluene | 20 |
| Santomers D [2] | 1 |
| | 120 |

[1] UOP-788 and UOP-288—Universal Oil Products, Des Plaines, Ill. UOP-288 is N,N'-bis-[1-methylheptyl]-paraphenylene diamine, UOP-788 is another N,N'-dialkyl p-phenylenediamine.

[2] Santomerse©—Monsanto Chemical Co., St. Louis, Mo. Strips 1 inch wide by 6 inches long and 0.075 inches thick, were exposed to ozone in an ozone generating chamber (ASTM-D-1149) Test Method of Accelerated Ozone Cracking of Vulcanized Rubber) at ozone concentrations of 50, 100, and 125 p.p.h.m. (parts of $O_3$ per hundred million parts of air), and at temperatures of 100° F. to 125° F. The samples were exposed in two conditions, loop sections and under 25% extension.

TABLE 1
[Typical sidewall compounds]

| | 1 | 2 | 3 | 4 |
|---|---|---|---|---|
| Smoked sheet #1 | 100 | 100 | | |
| SBR-1712 | | | 100 | 100 |
| SRF black | 50 | 50 | 50 | 50 |
| Zinc oxide | 5 | 5 | 5 | 5 |
| Stearic acid | 2 | 2 | 1 | 1 |
| Process oil | 6 | 6 | | |
| Age Rite Stalite | 1 | 1 | 1 | 1 |
| Sulfur | 2.5 | 2.5 | 2.5 | 2.5 |
| Santocure | 0.75 | 0.75 | 1.0 | 1.0 |
| Wax | | 2 | | 2 |
| UOP-288 | | 3 | | |
| Total | 167.25 | 172.25 | 160.5 | 165.5 |

Table 2 shows the outstanding protection afforded by the chemical protective coating described above. The coated samples did not show any cracking at these extensive exposures to severe ozone conditions. However, the same rubber samples without this protection cracked severely in less than 2 hours of exposure.

TABLE 2
[Time to crack in ozone chamber at 125° F. and 25% extension]

| Ozone concentration | Base stock 50 p.p.h.m. | Base stock 100 p.p.h.m. | Solution coated base stock 50 p.p.h.m. | Solution coated base stock 100 p.p.h.m. |
|---|---|---|---|---|
| Sample #1 | 30 min | 10 min | 480 hrs.[1] | 360 hrs.[1] |
| Sample #2 | 2 hrs | 1 hr | 480 hrs.[1] | 360 hrs.[1] |
| Sample #3 | 40 min | 10 min | 480 hrs.[1] | 360 hrs.[1] |
| Sample #4 | 2.5 hrs | 1.5 hrs | 480 hrs.[1] | 360 hrs.[1] |

[1] No cracking was observed and test discontinued.

EXAMPLE 2

To the sidewall of a tire in use are applied by brushing 2 coats of the solution described in Example 1. The protective solution is absorbed by the rubber and remains there to provide the protection from weathering for several months. Compared with a commercial tire paint which is usually a rubber base paint, the product of this example shows the following advantages: (1) It does not peel off or abrade, (2) it remains in place even under severe tire deflection, (3) it dries faster, (4) it offers full surface coverage and protection without exposing bare spots, (5) it lasts longer, and (6) it prevents further degradation and cracking of a rubber surface which shows ozone cracking.

EXAMPLE 3

A rubber compound 1–A–10 composed of the formulation shown below was mixed and cured on conventional laboratory mill and press-ASTM sheets 6 x 6 x 0.80 inches were vulcanized at 287° F. for 45 minutes. Strips 1 inch wide and 0.080 inches thick were cut from the sheets. Some of the strips were treated with 2 coats of the protective solution S–112 shown below and were exposed to 100 p.p.h.m. ozone at 100° F. in an ozone chamber for 240 hrs. Strips not treated with the protective solution S–112 were exposed to the same atmosphere and showed crack initiation within 9 hrs. Those treated did not show any cracking at the termination of the test or 240 hrs. All strips were tested according to ASTM D–1149 loop test method.

FORMULATION OF RUBBER COMPOUND #1–A–10

| Materials: | Parts by weight |
|---|---|
| Natural rubber | 50.0 |
| SBR-1712 | 68.5 |
| Diene 35 NF | 50.0 |
| Stearic acid | 2.0 |
| Zinc oxide | 4.0 |
| ISAF black | 85.0 |
| Process oil | 30.0 |
| Antiozonant | 2.0 |
| Parafin wax | 2.0 |
| Cyclohexylbenzothiazole sulfenamide | 0.9 |
| Sulfur | 1.75 |
| | 296.15 |

FORMULATION OF PROTECTIVE COATING S–112

| | By weight |
|---|---|
| UOP-288 | 25 |
| UOP-788 | 20 |
| Dipentene | 25 |
| Ethylene glycol methylether | 5 |
| Petroleum naphtha | 40 |
| Toluene | 10 |
| Tergitol NP-27 [1] | 1 |
| | 126 |

[1] Tergitol NP-27 is an alkyl phenyl polyethylene glycolether emulsifier and wetting agent, Nonionic, produced by Union Carbide.

EXAMPLE 4

A compound of acrylonitrile polyvinyl chloride blend commonly used for heavy duty conveyor belts was evaluated for ozone cracking. Some strips 1 x 6 x 0.080 were prepared. Some were treated with 2 coats of protective coating S–115 of the formulation below and exposed to an ozone chamber at 100 p.p.h.m. ozone at 100° F. for a period of 310 hrs. Strips were vulcanized at 300° F. for 45 minutes and were exposed in loop test according to ASTM D–1149 method. The untreated samples showed crack initiation after 48 hrs. of exposure. Those treated did not crack at the termination of the test or 310 hrs.

FORMULATION OF COATING S–115

| Material | Parts by weight |
|---|---|
| UOP–288 | 25 |
| UOP–788 | 20 |
| Dipentene | 25 |
| Ethyl butyl alcohol | 7 |
| Ethyl acetate | 5 |
| Petroleum naphtha | 40 |
| Toluene | 7 |
| Tergitol NP–27 | 1 |
| | 130 |

The acrylonitrile/PVC compound used is Goodyear's rubber #384 whose exact composition is not known.

In the appended claims the term "PPDA" is used to designate paraphenylene diamine. The terms "liquid terpene hydrocarbon" and "liquid" are used respectively to designate terpene hydrocarbons and liquids which are liquid at an ambient temperature encountered by the rubber article to be protected and to which the composition is applied.

It will be understood that, in accordance with the patent statutes, variations and modifications of the specific methods, compositions and articles disclosed and claimed herein may be made without departing from the spirit of the invention.

What I claim is:

1. A chemical coating composition of improved stability capable of migrating beneath the surface of a rubber article, and particularly adapted for the protection of the surface of a vulcanized rubber article which normally is deficient in resistance to ozone attack and weathering; said chemical coating composition comprising about 5% to 65% of at least one antiozonant for rubber, from 2% to 8% of a suitable wetting agent, about 5% to 50% of a penetrant which is selected from the group consisting of liquid terpene hydrocarbons and mixtures with a major proportion of one or more liquid terpene hydrocarbons with at least one member of the group consisting of a liquid alcohol of at least 6 carbon atoms, liquid aliphatic acetates and glycol ethers and at least sufficient total of volatile solvents selected from the group consisting of volatile aliphatic hydrocarbons, volatile aromatic hydrocarbons, and volatile chlorinated aliphatic hydrocarbons to make a penetrant-solvent mixture having not over 75% by weight of said penetrant, said solvents having a boiling point above 30° C. and below 135° C.

2. The product according to claim 1 wherein the antiozonant is an $N_1N'$-dialkyl paraphenylene diamine.

3. The product of claim 1 wherein the antiozonant is selected from the group consisting of:

$N_1N'$-dioctyl PPDA
$N_1N'$-bis-(1-ethyl-3-methylpentyl)-PPDA
$N_1N'$-bis-(1-methylheptyl)-PPDA
$N_1N'$-di-sec-butyl-PPDA
$N_1N'$-phenyl-1,3-dimethyl-butyl-PPDA
$N_1N'$-dimethyl-$N_1N'$-di(methylpropyl)-PPDA
$N_1N'$-diphenyl-PPDA
$N_1N'$-di-$\beta$-naphthyl-PPDA
Unsymmetrically substituted phenylenediamine
Monooctyl- and dioctyl diphenylamine
Modified $N_1N'$-di-$\beta$-naphthyl-PPDA
N-cyclohexyl-N'-phenyl-PPDA
N-isopropyl-N'-phenyl-PPDA
N-o-tolyl-N'-phenyl-PPDA 4. The product according to claim 3 wherein the wetting agent contains an alkyl aryl group.

5. The product according to claim 4 wherein the wetting agent is an alkyl aryl sulfonate.

6. The product according to claim 3 wherein the acetate contains 2 to 8, inclusive, carbons in the alcohol portion of the ester.

7. The product according to claim 1 wherein the antiozonant is $N_1N'$-dioctyl-p-phenylene-diamine.

8. The product according to claim 7 wherein at least 50% of the volatile solvent present is an aliphatic petroleum naphtha and the terpene is selected from the group consisting of pinene, dipentene and pine tar.

9. The product of claim 1 wherein the volatile solvent contains a minor proportion of a liquid chlorinated aliphatic hydrocarbon.

10. The product of claim 6 wherein the volatile solvent contains at least 50% of an aliphatic petroleum naphtha and a minor portion of a liquid chlorinated aliphatic hydrocarbon.

11. A composition according to claim 1 in which the volatile solvent carrier is a mixture of 10% to 50% of aliphatic hydrocarbons, 5% to 40% of liquid chlorinated aliphatic hydrocarbons, and 5% to 40% of liquid aromatic hydrocarbons.

12. A composition according to claim 3 wherein the volatile solvent carrier is a mixture of 10% to 50% of aliphatic hydrocarbons, 5% to 40% of liquid chlorinated aliphatic hydrocarbons, and 5% to 40% of liquid aromatic hydrocarbons.

References Cited

UNITED STATES PATENTS

| | | | |
|---|---|---|---|
| 3,344,099 | 9/1967 | Cahill | 260—33.6 A |
| 2,432,830 | 12/1947 | Sturgis | 260—576 |
| 2,324,980 | 7/1943 | Kilbourne | 260—33.6 A |
| 2,746,515 | 5/1956 | Usack | 117—139 |

FOREIGN PATENTS

| | | | |
|---|---|---|---|
| 815,263 | 6/1959 | Great Britain | 117—139 |

THEODORE MORRIS, Primary Examiner

U.S. Cl. X.R.

117—139